FLIP-FLOP

GATE CIRCUIT

MONOSTABLE MULTIVIBRATOR

3,040,259
AUTOMATIC SWITCHING CIRCUIT
Alan Groudan, Flushing, William M. Wirfel, Glendale, Howard E. Lustig, Flushing, and Ralph Dessauer, Elmhurst, N.Y., assignors to Sperry Rand Corporation, Ford Instrument Company Division, Long Island City, N.Y., a corporation of Delaware
Filed June 3, 1958, Ser. No. 741,439
4 Claims. (Cl. 328—110)

This invention relates to profile plotting devices and especially to cartographic type data devices adapted to decode contour line information and present the data in such a form that the profile may be plotted automatically.

It is contemplated that the decoding device is to be associated with an encoder and scanner which are responsive to the selected colors of the elevation lines on a contour type data map and are adapted to furnish elevation indicating pulses to a plurality of output lines as the contour map is scanned. The device of this invention receives these pulses, each of which are representative of a preselected color and elevation, and employs them to detect changes in elevation according to a preselected color sequence of increasing and decreasing values. A special gate circuitry has been arranged to yield signals according to the arbitrary sequence of colors scanned and there is provided a reader or profile plotter which receives the signals and is controlled according to the sequence of line color scanned by the encoder. The means for decoding the contour line information is thus rendered automatic as is the means for plotting a profile of the region on a map on which the colored contour lines are imposed.

There follows a specific description of one embodiment of the invention which is taken in conjunction with the accompanying drawings, in which—

Three codes are the minimum number required such that complete profile data may be read from a map without ambiguity. The encoder which supplies the incoming signals for the instant device uses three colors to code all the contour lines on a given map. The contours are so coded that in going from one colored contour to the next, the sequence of colors will indicate whether the new contour line is of higher, lower or the same value as the previous contour line. For example, if we designate the sequence green, white, red, green as indicating contour lines of increasing value, then in going from a green line of value five units to a following white line, the value of the new contour line would be six units. Similarly, in going from a green line of value five units to a red line, the new contour line would have a value of four units. If there appear two or more consecutive lines of the same color, each line after the first one will be considered a "same" which is useful in plotting the profile, but has no change in value associated with it.

Figure 1:
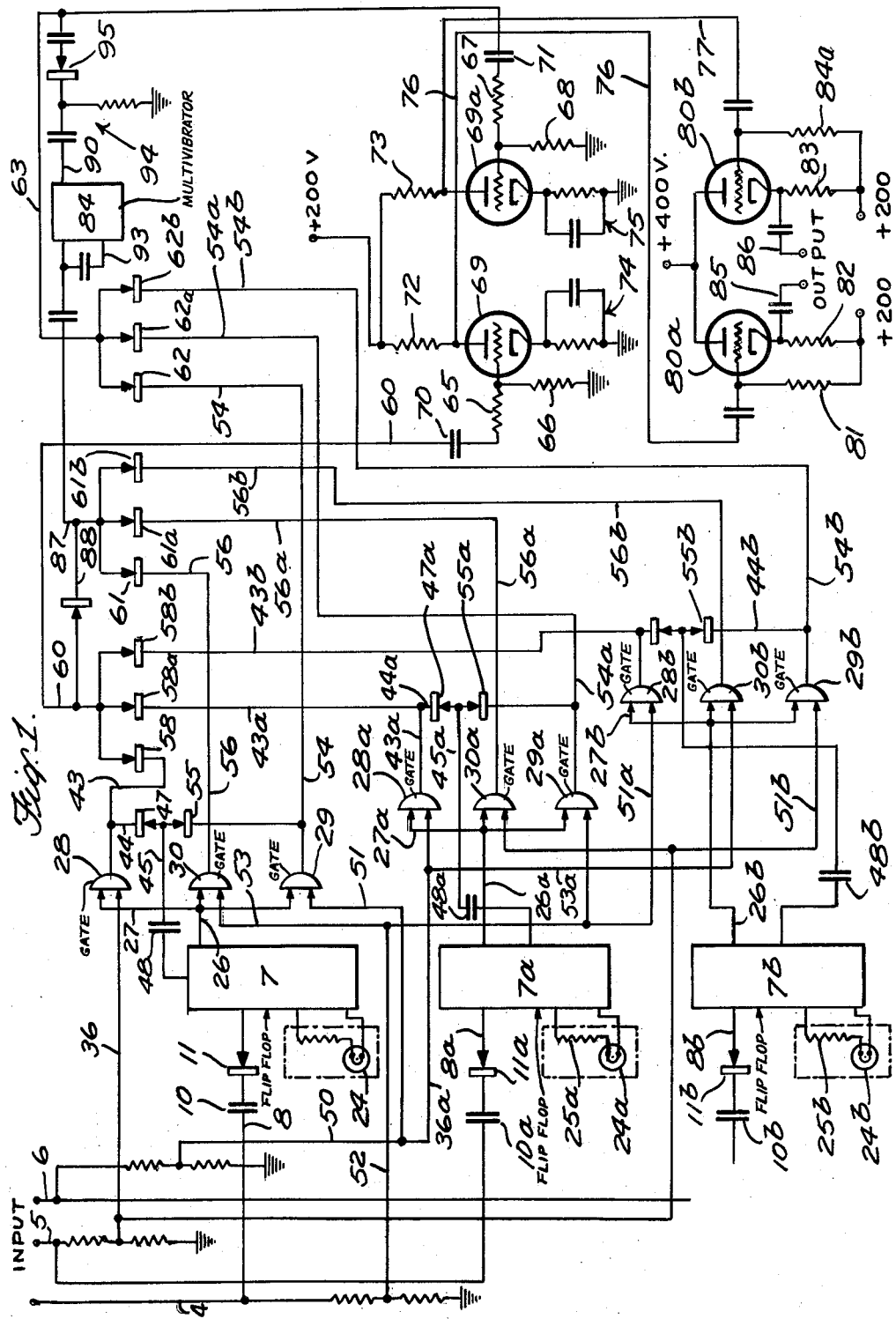
FIG. 1 is a block diagram of the contour line decoder.
Figure 2:
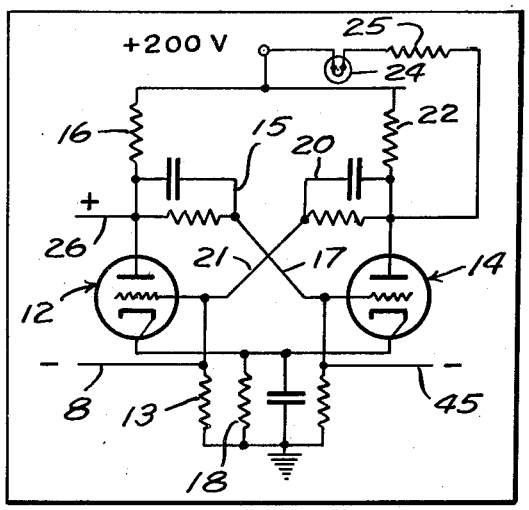
FIG. 2 is a diagram showing the flip flop circuit employed in the system.

Accordingly, the decoder, which is schematically illustrated in FIG. 1, receives the signals from the encoder on lines 4, 5 and 6 which are adapted to receive pulses representing the green, white and red colors, respectively, of the contour lines. When a negative pulse appears on the line 4, it is fed to a flip flop on lead 8 in which there is provided a capacitor 10 and half wave rectifier 11. As shown in FIG. 2, ampifier tube 12 in the flip-flop is biased by virtue of the presence of resistor 18 and grid resistor 13 which is connected to the lead 8. The output of amplifier tube 12 is coupled to amplifier tube 14 by means of RC network disposed between its plate electrode and plate resistor 16 and grid lead 17. The amplifiers are cathode coupled to ground through the common resistor 18. A feedback circuit including RC network 20 and lead 21 connects the plate end of plate resistor 22 of the amplifier tube 14 to the grid of the amplifier tube 12. A lamp circuit having a lamp 24 and resistor 25 is connected between the plate voltage source and the plate end of the resistor 22 and is energized when the amplifier tube 14 is caused to conduct as a result of the cutting off of the amplifier tube 12 when a negative pulse is placed on its grid.

Figure 3:
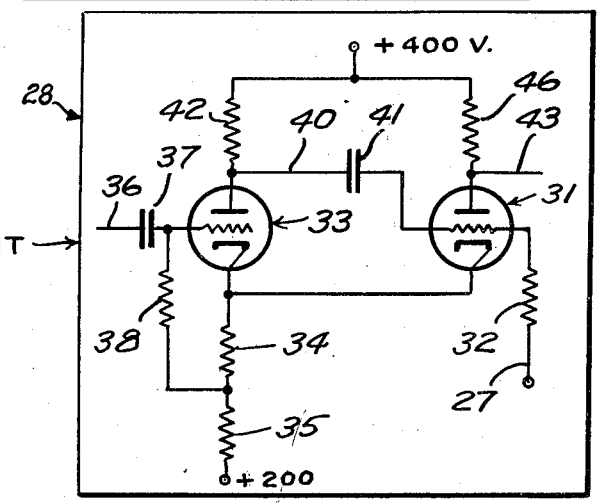
FIG. 3 is a diagram showing the gate circuit employed in the system.
Figure 4:
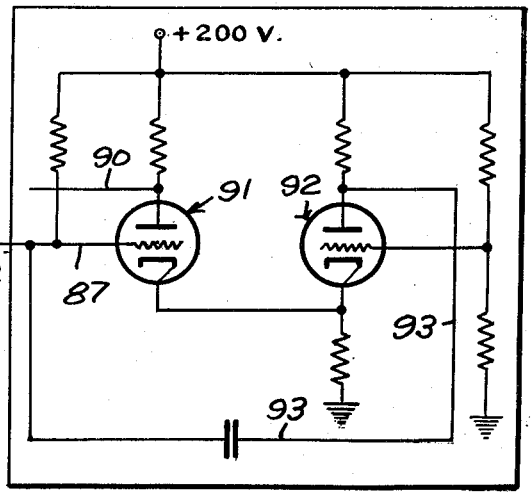
FIG. 4 is a diagram showing the monostable multivibrator employed in the system.

A lead 26, which is connected to the plate side of the resistor 16 of the amplifier tube 12, is connected to the input lead 27 for three gates 28, 29 and 30. As shown in FIG. 3, the lead 27 is actually connected into the grid of gate amplifier tube 31 and has a grid protecting resistor 32. Gate amplifier tube 31 is cathode coupled to an amplifier 33, the two amplifiers sharing cathode resistors 34 and 35. A grid lead 36 feeds negative pulses representing the scan color white to the grid of the amplifier tube 33 through the grid capacitor 37. Grid resistor 38 and cathode resistor 34 serve to bias the amplifier tube 33. The grid of the amplifier 31 is also controlled by the plate voltage of the amplifier 33 by virtue of the plate-grid connection 40 which includes grid capacitor 41. Plate resistor 42 reduces the voltage on this grid connection substantially below the 400 volt plate supply when amplifier tube 33 is conducting. The voltage on the grid of the amplifier tube 31 approaches the 400 volt supply when the amplifier tube 33 is cut off by negative pulses on its grid. The voltage on plate lead 43 and connected feedback leads 44 and 45 are normally at plate supply but are sharply and momentarily reduced by means of plate resistor 46 of the amplifier tube 31 when the latter is caused to conduct. Half wave rectifier 47 in the lead 44 and grid capacitor 48 in the lead 45 permit the negative pulse output of the gate 28 to be placed on the grid of the amplifier tube 14 so as to restore the flip flop circuit to its normal state.

Gate 29 and gate 30 are also grid connected to the flip flop connection 26 by lead 27. The second input connection for gate 29 is made to the line 6 via leads 50 and 51 which convey the negative pulses representing red, and the second input connection for the gate 30 is made to the line 4 via leads 52 and 53 which convey pulses representing green. The output of the gate 29 is placed on line 54 to which the flip flop restoring lead 44 is connected. A second half-wave rectifier 55 poled to pass negative pulses is inserted in the lead 44 between the output lead 54 and the feedback lead 45. Because the output on lead 56 of the gate 30 is produced by the coincidence of two signals representing the same color, which in this case is green, no restoring connections are provided between the gate 30 and the flip flop 7.

The decoder system which includes the flip flop 7 and the gates 28, 29 and 30 is duplicated for the other two colors, white and red. The above described decoder uses the color green in effect as a reference color or basis of comparison with the other two colors in determining the sequence of colors scanned. In the other two decoder systems, white is used as a reference color in one system in which the subscript $a$ is appended to the numerical references (corresponding units and connections in the three systems being assigned the same numerical references), while red is used as a reference color in the third system in which the subscript $b$ is appended to the numerical references in the drawings.

Half wave rectifiers 58, 58$^a$ and 58$^b$ are inserted in the gate output lines 43, 43ª, 43ᵇ, respectively, which are joined to profile "up" signal line 60 to which a grid of triode tube 69 is tied. Similarly, half wave rectifiers 62, 62ª and 62ᵇ are provided in the gate output lines 54, 54ª and 54ᵇ, respectively, which are joined to profile "down" signal line 63 to which the control grid of the triode 69ª is connected. The triodes 69 and 69ª have grid resistors 65 and 66, and grid resistors 67 and 68, respectively, and grid capacitors 70 and 71, respectively. The dual output of the triodes is taken from the plate electrodes. The instantaneous plate voltages are controlled by the grid voltages in conjunction with a 200 volt plate supply, plate resistors 72 and 73 and the RC cathode networks 74 and 75. The voltage outputs of the two triodes are fed on leads 76 and 77 to a triode 80ª and a triode 80ᵇ, respectively, having grid and cathode resistors 81, 82 and 84ª, 83, respectively, which are supplied by a 200 volt source. A fixed 400 volt supply is connected to the plates thereof. The dual output of the triodes 80ª and 80ᵇ are placed on follower leads 85 and 86 and serves to drive the profile plotter in a direction determined by the triodes 69 and 69ª.

In order for the profile plotter to maintain its position so as to indicate no change of elevation when there is no change of color from one scan line to the succeeding line, negative pulses are employed serially and are placed on grid lines 60 and 63 with a delay determined by the monostable multivibrator 84. The circuit design for achieving this condition may be described as follows:

The output lines 56, 56ª and 56ᵇ, which are negatively pulsed by the gates 30, 30ª and 30ᵇ, are joined to a common lead 87 thru half wave rectifiers 61, 61ª and 61ᵇ. The lead 87 is connected to the profile "up" signal lead 60 by means of the lead 88 and to the profile "down" signal lead 63 through the monostable multivibrator 84. The pulsing of the profile "up" and "down" signal leads causes the triodes 69 and 69ª to place serial pulses on the cathode follower leads 85 and 86 of the triodes 80ª and 80ᵇ. The multivibrator 84 places a positive pulse on its output lead 90 as a negative pulse is fed to the grid of triode 91 and to the plate of triode 92 on capacitance lead 93. The triodes are cathode coupled and the negative pulse on the grid of triode 91 lowers the cathode bias of the multivibrator causing the triode 92 to conduct and further lower the voltage on the grid of triode 91 until triode 91 is completely shut off. With triode 91 completely off there will be a sharp positive pulse placed upon the output lead 90 which is differentiated on RC network 94 and passed by half wave rectifier 95 and fed to profile "down" signal lead 63 to triode 69ª.

The decoder system which uses the color green as the reference color to establish a sequence of colors scanned immediately thereafter employs the gates 28, 29 and 30. The operation of the other two systems is the same in principle and their operation need not therefore be described. The embodiment described herein arbitrarily employs the sequence green, white, red, for increasing values of elevation. The operation of the system beginning with the color green may be described as follows:

When a negative pulse appears on the grid of the tube amplifier 12 in the flip flop 7 as the color green is scanned, the lamp 24 is turned on and a high positive voltage appears on the grid of amplifier tube 31 in the gate circuits 28, 29 and 30. Now, if the next contour line scanned should be white, a negative pulse appears directly on the grid of amplifier tube 33 in the gate 28 causing the gate to yield a negative pulse to the profile "up" signal line 60 of the profile plotter and to the flip flop 7 to restore the latter to its normal state. If, instead of white the next contour line scanned should again be green, the gate 30 is caused to yield a negative pulse to the profile "same" signal line 87. If on the other hand the succeeding contour line is neither white nor green but is red, the gate 29 would be energized by a negative pulse on the line 51 so as to yield a pulse to the profile "down" signal line 63 and also a restoring pulse to the flip flop 7. From green to red is the order of decreasing value and the system therefore provides a negative pulse for profile "down" signal to the plotter.

Various modifications in the circuit arrangement may effected by persons skilled in the art without departing from the scope of invention as defined in the appended claims.

What is claimed is:

1. In an automatic switching circuit a plurality of input lines adapted to receive pulses from a pulse generator, a flip-flop connected to one of said input lines, a plurality of coincident pulse gates, each of said gates being connected to said flip-flop and separately to one of said input lines and restoring means connecting all but one of said gates to said flip-flop for restoring the latter, the output of said gates yielding pulses representative of the sequence of pulses received on said input lines.

2. In an automatic switching circuit comprising a plurality of input lines adapted to receive pulses from a pulse generator, a flip-flop connected to one of said input lines, a plurality of coincident pulse gates connected to said flip-flop, each of said input lines being connected separately to one of said gates, restoring means connecting the output of said gates which are connected to the other of said input lines, to said flip-flop, an amplifier means connected to each of said gates and a delay signal means, said delay means being connected between said amplifier means and the gate having non-restoring means, the output of said amplifier means yielding pulses representative of the sequence of pulses received on said input lines.

3. An automatic switching circuit comprising a plurality of input lines adapted to receive pulses from a pulse generator, a number of flip-flops corresponding to the number of said input lines, the input lines having individual connections each to a separate one of the flip-flops, a plurality of coincident pulse gates, the output side of each flip-flop being directly connected to a group of said gates, the number of gates within the group corresponding to the number of said input lines, each gate in each group of gates being connected directly and separately to one of said input lines, a restoring connection between the input side of each flip-flop and all but one of the gates composing the group of gates connected to the output of said flip-flop and a plurality of output lines, each output line being connected to receive the output of one gate in each group of gates.

4. An automatic switching circuit as claimed in claim 3 having an amplifier means connected to the output of said gates, the output of said amplifier means yielding pulses representative of the sequence of pulses received on said input lines.

No references cited.